United States Patent [19]
Waite

[11] Patent Number: 5,555,456
[45] Date of Patent: Sep. 10, 1996

[54] RECONFIGURABLE FAULT CONTROL APPARATUS

[75] Inventor: Eugene L. Waite, Wilmette, Ill.

[73] Assignee: ITT Corporation, New York, N.Y.

[21] Appl. No.: 284,870

[22] Filed: Aug. 2, 1994

[51] Int. Cl.⁶ .................................................. G08B 21/00
[52] U.S. Cl. .......................... 340/635; 340/638; 340/644; 340/501
[58] Field of Search .................................. 340/635, 638, 340/644, 616, 618, 500, 501; 371/61, 62; 395/185.04, 185.06, 185.07, 185.08; 324/535, 537

[56] References Cited

U.S. PATENT DOCUMENTS

| 3,566,040 | 2/1971 | Lucas | 371/62 |
|---|---|---|---|
| 4,200,226 | 4/1980 | Piras | 395/185.08 |
| 4,332,105 | 6/1982 | Nir | 47/1 R |
| 4,399,537 | 8/1983 | Jones | 395/182.21 |
| 4,558,389 | 12/1985 | Black, Jr. et al. | 361/88 |
| 4,718,020 | 1/1988 | Duich et al. | 364/500 |
| 4,757,303 | 7/1988 | Scheidweiler | 340/501 |
| 4,811,200 | 3/1989 | Wagner et al. | 364/200 |
| 4,982,404 | 1/1991 | Hartman | 395/185.08 |
| 5,008,655 | 4/1991 | Schlesinger et al. | 340/635 |
| 5,054,023 | 10/1991 | Kronberg | 371/16.3 |
| 5,113,504 | 5/1992 | Matsuda | 395/185.08 |
| 5,129,415 | 7/1992 | Runyon et al. | 137/113 |
| 5,225,813 | 7/1993 | Raub, Sr. | 340/623 |
| 5,285,053 | 2/1994 | Fowler | 219/506 |
| 5,309,445 | 5/1994 | Bartels | 371/164 |
| 5,321,392 | 6/1994 | Skakoon et al. | 340/635 |
| 5,398,332 | 3/1995 | Komoda et al. | 395/185.08 |
| 5,408,645 | 4/1995 | Ikeda et al. | 395/185.08 |

Primary Examiner—John K. Peng
Assistant Examiner—Ashok Mannaua
Attorney, Agent, or Firm—Menotti J. Lombardi; Arthur L. Plevy; Plevy & Associates

[57] ABSTRACT

A fault control apparatus is disclosed having elements that provide for an easily reconfigurable fault response. When the fault detection circuit signals that a fault has occurred, an alarm is triggered, switching means are automatically set to their fault positions, and a control output circuit is activated. The flexibility of fault response is made possible by the use of a matrix of switched connections to preset the fault positions of the relays. Additional flexibility is provided by providing an adjustable level for the control output.

20 Claims, 7 Drawing Sheets

RECONFIGURABLE FAULT CONTROL APPARATUS

FIELD OF THE INVENTION

This invention relates generally to fault tolerant process controllers and more particularly to fault tolerant process controllers used to monitor the flow of fluids or gases throughout a system.

BACKGROUND OF THE INVENTION

By the turn of the century the field of automatic process control had become an area of concentrated scientific research. The idea of using machines rather than people to monitor automatic processes was attractive to businessmen seeking to streamline their operations. Automatic monitors could operate continuously, at a low cost, and they could be equipped to rapidly respond to changing conditions in the monitored process. These machines were "intelligent" in the sense that they employed logical elements to "make decisions" about the state of the process based on information received through process sensors. After evaluating the information, an automatic monitor could set the state of the monitored process according to some preset sequence of instructions. The earliest automatic process controllers were limited to one preset response. However, as the logical elements of the monitors evolved adaptive responses became possible.

The logical elements of automatic process controllers evolved steadily from their modest beginnings to the current state of the art. They progressed from electro-mechanical devices and pneumatics, to electron tubes, and eventually, to logic gates composed of multiple transistors. The advent of transistors quickly led to the use of integrated circuits and, in turn, to the use of microprocessors. By the late 1960's the computer was introduced as the main logic element of automatic process controllers.

The use of microprocessors and computers as the main logic elements of automatic process controllers gave designers the freedom to implement complex control processes which could respond to any number of problems within the monitored process. One problem that designers set out to solve was that of continuity of the process. This problem arises when a critical element within the control loop begins to malfunction, giving rise to an error indication and corresponding process shutdown. Such a shutdown could have disastrous consequences. For example, the dire results of a failure in a critical element of an aircraft's fuel supply system which caused the process controller to direct a shutdown of the entire fuel system, without a backup mode in place, are obvious. To solve continuity of process problems such as this, designers made use of microprocessor controlled logic elements to implement "fail safe" designs that would avoid process shutdowns.

Automatic process controllers began to incorporate systems that would maintain the process in a static condition upon the occurrence of a failure. An example of such a fail safe design is the crash avoidance mechanism present in many of today's jet fighter planes. The planes are equipped with sensors capable of detecting the pilot's loss of consciousness or "blackout"—an event which may occur when the pilot is executing high g force maneuvers. In the event that a "blackout" is detected the plane's control surfaces are adjusted via computer to maintain straight and level flight. In this manner, a blackout will not result in the loss of the plane and pilot. While fault tolerant systems which can maintain processes in a static condition offer many advantages, even greater advantages are realizable by systems that capable of implementing one of several static conditions.

Fault response systems which maintain a process in a static condition are usually hardwired. This makes them difficult to reconfigure without burdensome re-wiring. Thus, they are inflexible and can not be adapted to changing conditions in the monitored process.

In overcoming the disadvantages of prior-art process controllers, the present invention provides easily reconfigurable fault response circuitry. The invention allows the fault response of the system to be varied either by a human operator or through additional logical elements, thereby providing a highly flexible fault response.

SUMMARY OF THE INVENTION

It is an object of the present invention to provide fault control circuitry for automatic process controllers and to provide means for easily reconfiguring the circuitry to change the fault response.

That object is achieved through the use of a plurality of control relays that are responsive to a fault detection circuit. When a fault is detected the circuit selectively opens or closes the relays for the duration of the fault. Accordingly, the process elements that are controlled by the relays will be selectively turned on or off for the duration of the fault. The fault responsive state of each relay, and hence the state of the elements they control, is determined by a matrix of switched connections which provide great flexibility in the fault states that may be implemented.

In addition to providing switching for various process elements, the fault control circuitry may be used to generate a control signal in the event that the controller can no longer generate such a signal. A "fail safe" control signal is turned on by one of the relays in response to a failure indication from the fault detection circuit. The control signal may be a digital or an analog signal, and in a preferred embodiment is an analog signal. The level of the analog control signal is preset and may be varied within a built in range of values through the use of any of various well-known means for varying a voltage or current output.

It is a further object of the present invention to provide a cost effective means of protecting the analog input circuitry of an automatic process controller.

The desired protection of the analog input components is achieved by inserting a resistor between the analog input terminals of an automatic process controller. In the event that the analog signals received from the process sensors are interfered with, causing a fault such as an incorrect polarity, a short circuit, or a higher than normal potential, the resistor will receive the full impact of the fault and acts as a fuse. The resistor provides protection for the analog circuitry, it is cheap, and it is easily replaceable. In the event a fault does occur and the resistor is sacrificed, a technician needs only to unplug the "burnt" resistor and plug in a new one.

In an illustrative embodiment the fault response circuitry of the present invention is used in a fluid control system. Relays are used to turn on variable speed pumps while the analog control signal is used to set the speed of the pumps. Each analog input terminal has two jumper sockets into which a protective resistor is inserted.

DETAILED DESCRIPTION

Figures 1, 2:
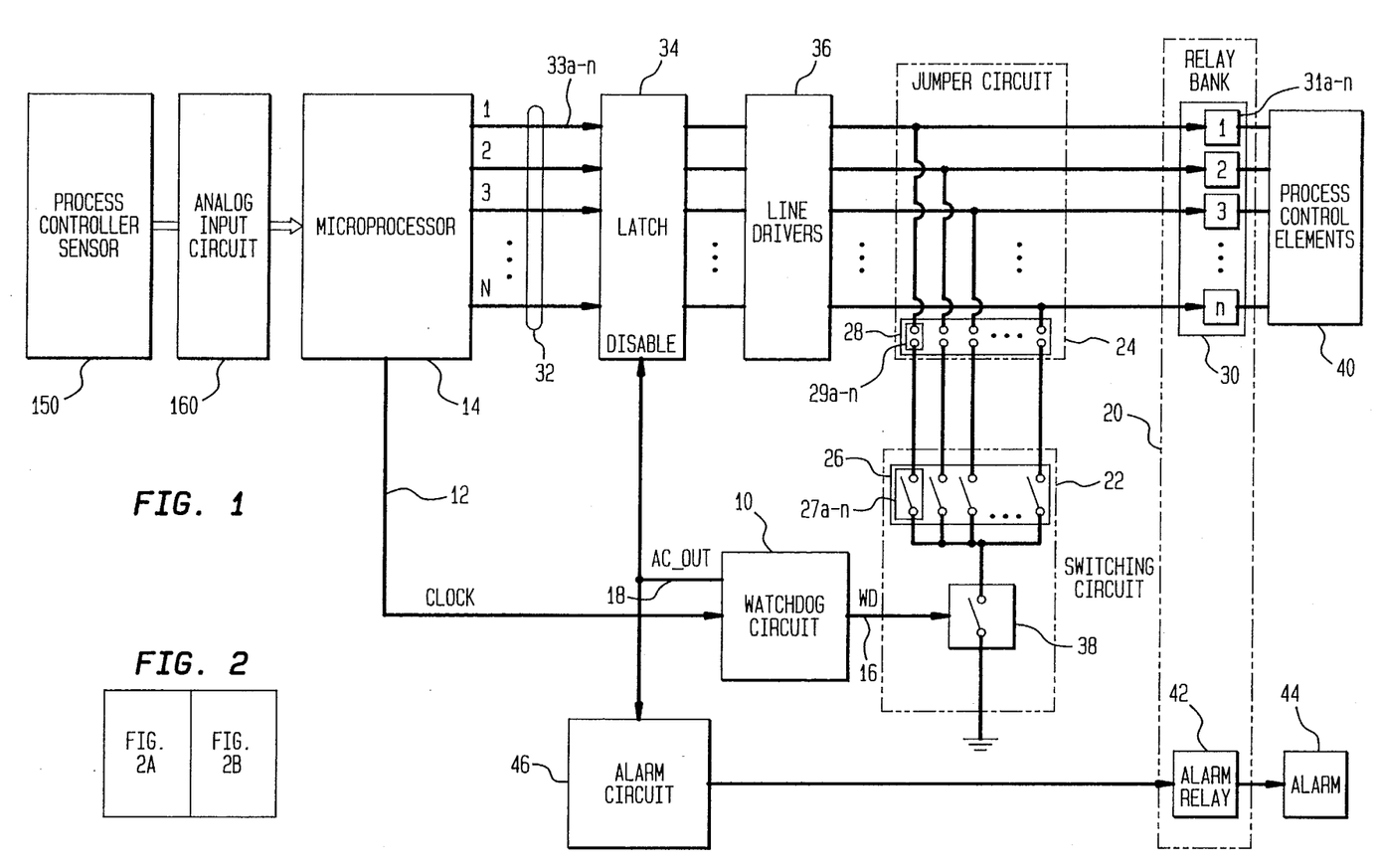
FIG. 1 is a block diagram of the apparatus of the invention.
FIG. 2 is a schematic diagram of an illustrative embodiment of the invention.
Figure 2A:
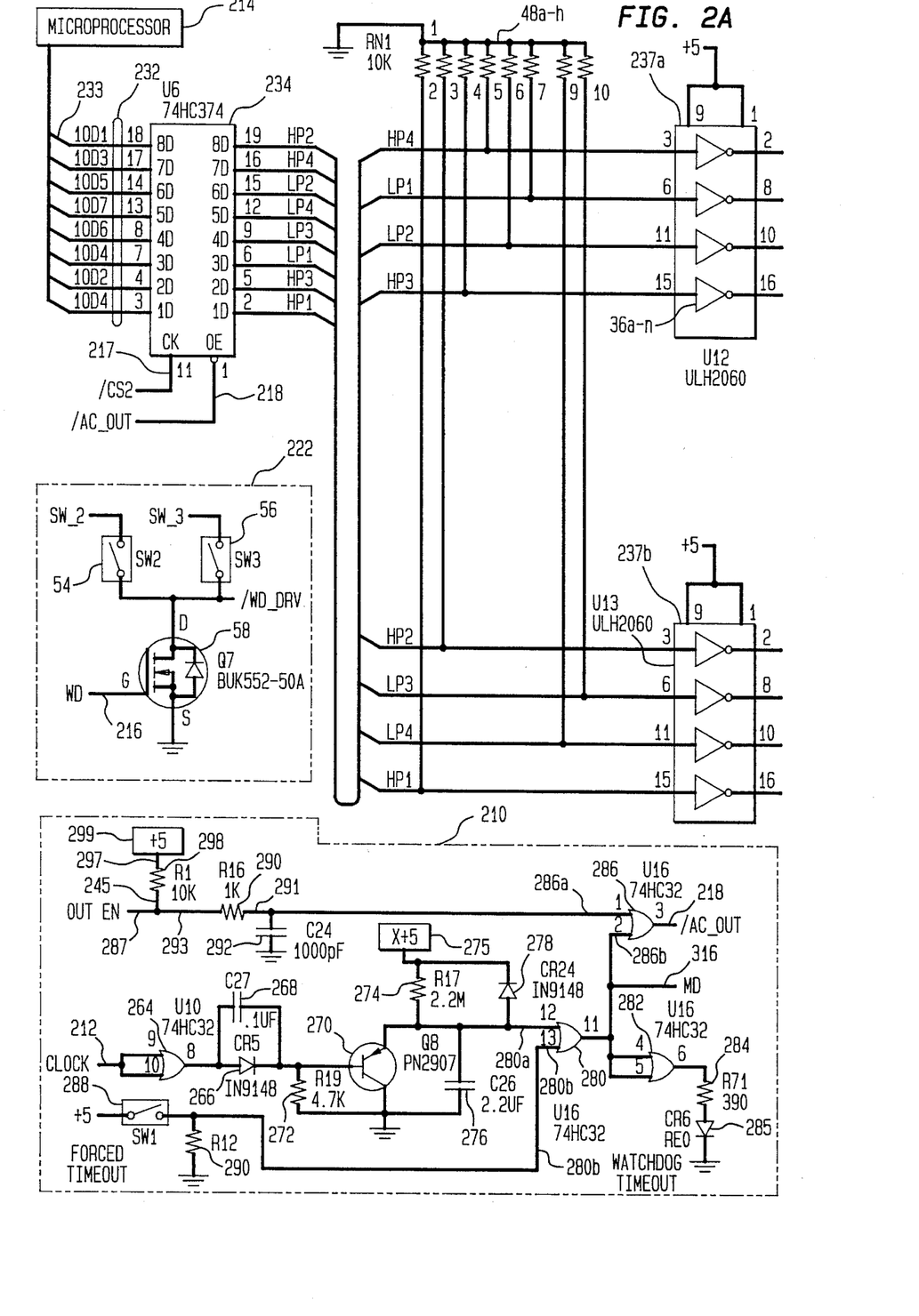
Figure 2B:
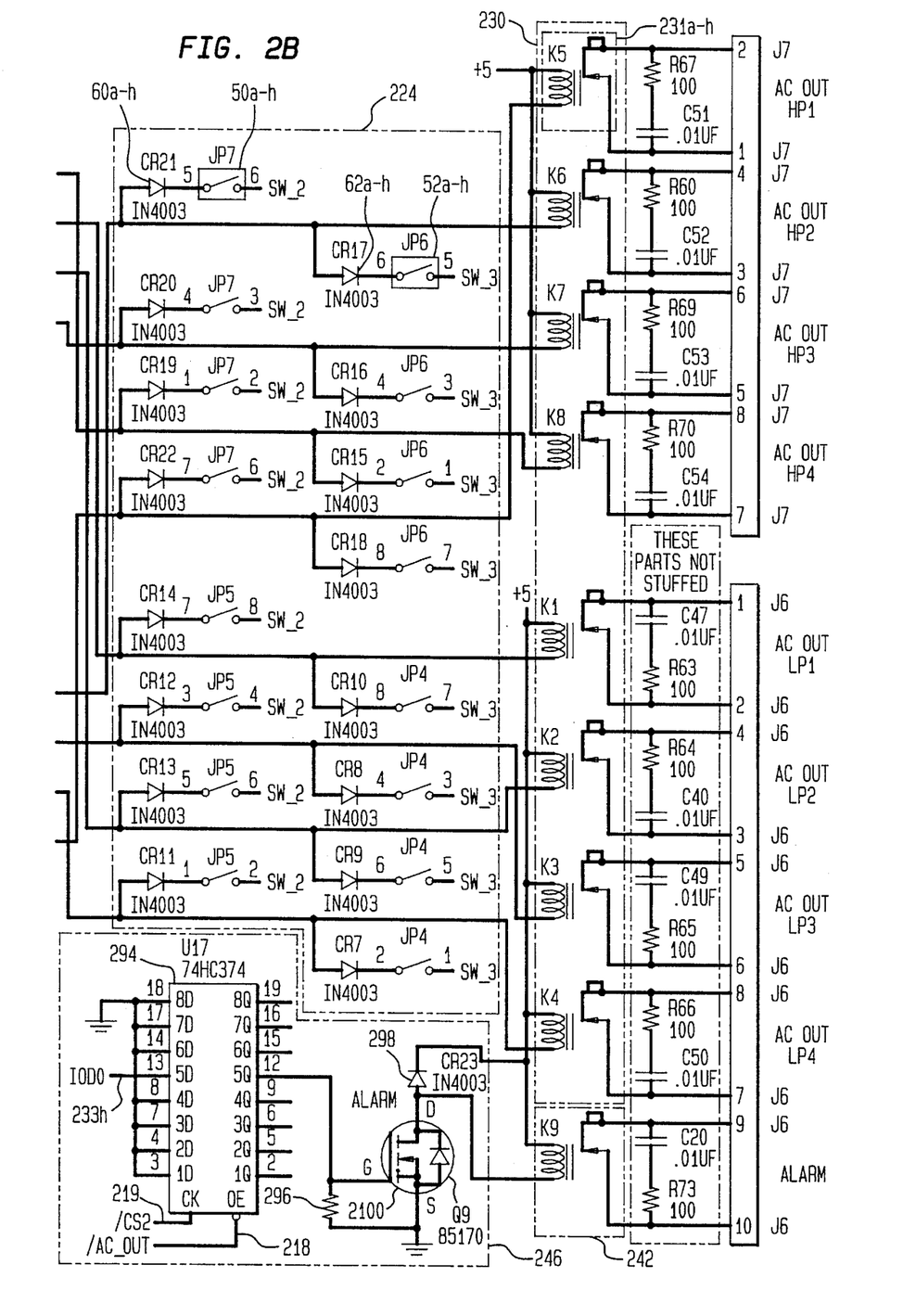

Referring now to FIG. 1, there is shown a block diagram of an automatic process controller employing the present invention. As can be seen from the diagram, the controller may effectuate control over the process by means of one or more relays 30 that are used for the switching of one or more process control elements 40. When the controller is functioning correctly the positions of the relays 30 are determined by one or more relay signals 32 generated by a microprocessor 14. However, in the event that the microprocessor should fail or be removed the position of the relays will be determined by a jumper circuit 24 and a switching circuit 22. Thus, it is the jumper circuit 24 and switching circuit 22 that determine the fault response state of the process control elements 40 by setting the fault positions of the relays 30.

The fault response of the controller is triggered by means of a watchdog circuit 10. The watchdog circuit 10 continuously monitors a clock signal 12 generated by the microprocessor 14. If the microprocessor 14 fails or is removed the resulting absence of the clock signal 12 will actuate the watchdog circuit 10. When activated, the watchdog circuit generates two signals, an AC-OUT signal 18 that disables the relay signals 32, and a watchdog signal 18 that enables the jumper circuit 24 and switching circuit 22. In this manner the fault response, as determined by the jumper circuit 24 and switching circuit 22, is triggered by the watchdog circuit 10.

In order to more fully appreciate the operation of the present invention a detailed description of the circuitry associated with an single relay 31a will be provided. It will be understood that one of ordinary skill in the art of circuit design can duplicate the circuitry associated with relay 31a to provide for the simultaneous control of any desired number of relays—as illustrated in the diagram by the circuitry associated with relays 31b–n.

Referring further to FIG. 1, it can be seen that under normal operating conditions a relay signal 33a generated by the microprocessor 14 is passed to a line driver 36 by means of a latch 34. The latch 34 ensures the stability of the relay signal 33a, while the line driver 36 amplifies the output of the latch 34 so that the propagation losses do not degrade the signal to the point where it would not be effective for setting the position of the relay 31a. The line driver 36 is coupled to the input of the relay 31a and serves to isolate the output of the latch 34 from the input of the relay 31a. The jumper circuit 24 is also coupled to the output of the line driver 36, with the switching circuit 22 being coupled to the jumper circuit 24 and providing a path from the output of the line driver 36 to ground. When a jumper is inserted into jumper contact 29a and switch 27a is closed, an absent microprocessor clock signal 12 will result in the grounding of the input to relay 31a. This grounding occurs because the watchdog signal 16, generated in response to the missing clock signal activates the switching circuit 22 by closing a switching circuit enabling switch 38, thereby completing the path from the input of relay 31a to ground. Once the input of relay 31a is grounded, relay 31a will revert to its "grounded" or "fault" position, regardless of the value of the output of the line driver 36.

The output of relay 31a is used to control some aspect of the controlled process through one or more process control elements 40. The fault position of the relay 31a—as predetermined by the presence or absence of a jumper at contacts 29a and the position of switch 27a—will therefore determine the state of one or more process control elements upon the occurrence of a fault. As can be seen from FIG. 1, any number of relay input lines 32 may be implemented. If n lines 32 are implemented, then n contacts 28 and n switches 26 will be required to independently control the fault response of each of n relays 30. Of course, one of the contacts 28 may be coupled to more than one relay 30 so that n relays 30 may be controlled by less than n contacts 28. Similarly, one of the switches 26 may be used to switch more than one relay 30.

Referring further to FIG. 1, it can be seen that an additional relay 42 is used to trigger an alarm 44. Relay 42 is controlled by an alarm circuit 46 that is, in turn, controlled by the watchdog circuit 10. In the event of a fault, the AC-OUT signal 18 generated by the watchdog circuit disables the latch 34 and enables the alarm circuit 46. The alarm circuit then triggers the alarm 44 through the alarm relay 42.

In addition to providing relay fault positions and the triggering of an alarm relay, the invention provides a fault response for those process control elements that require analog inputs.

Figure 3:
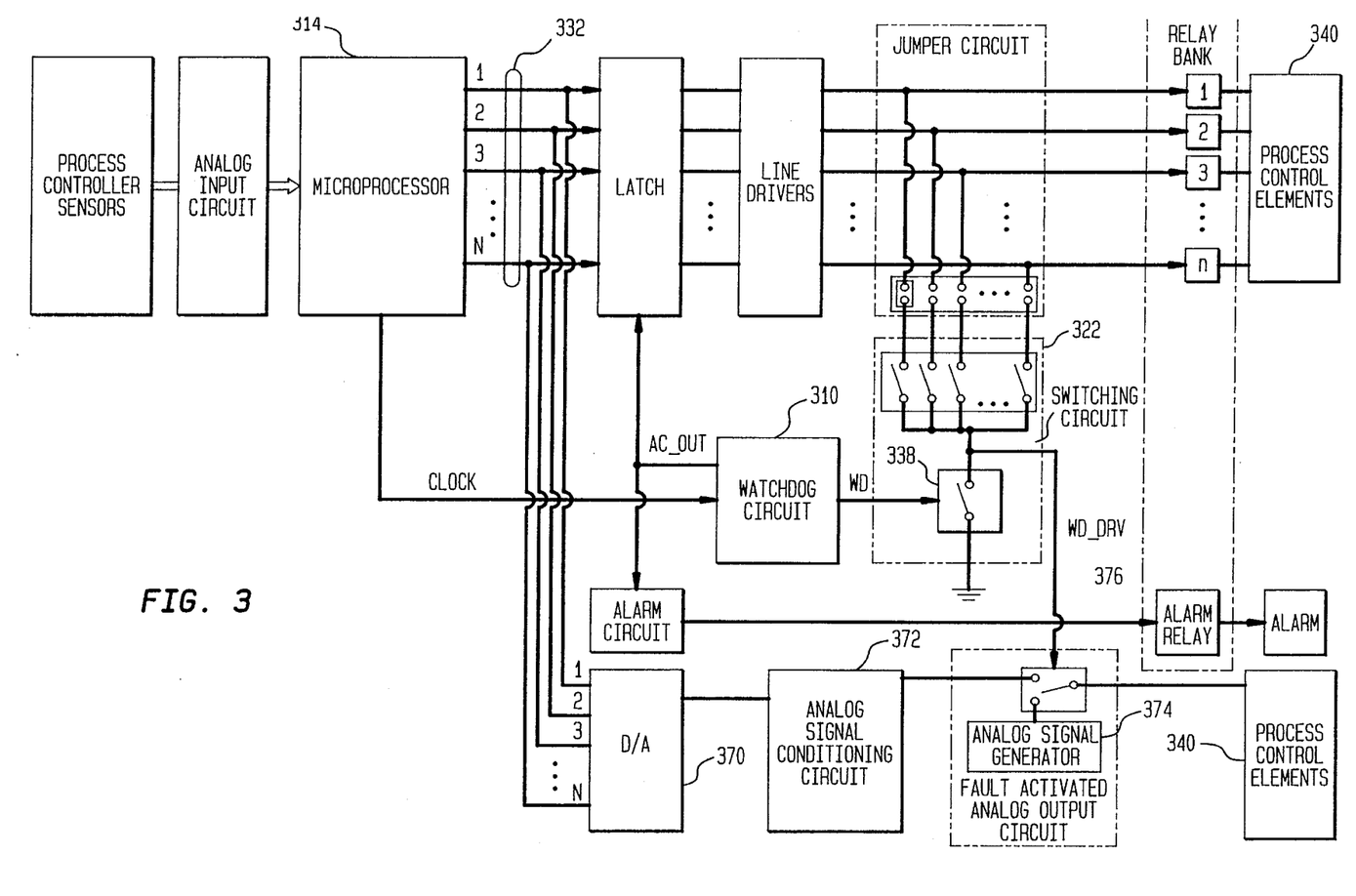
FIG. 3 is a block diagram of the invention including an analog output portion.

Referring to FIG. 3, there is shown a block diagram of an automatic process controller having process control elements 340 requiring analog inputs and employing the present invention. A microprocessor 314 generates outputs 332 which may be used to control relays 30 as well as to set the level of the analog inputs required by the process control elements 340. When used to set the level of the analog inputs, the microprocessor outputs 332 are coupled to a Digital to Analog (D/A) converter 370. The output of the D/A converter 370 is coupled to an analog signal conditioning circuit 372 which conditions the signal so that it is in a form that is usable by the process control elements 340. Under normal operating conditions, the output of the analog signal conditioning circuit 372 is coupled to the process control elements 340. However, in the event that the microprocessor 314 fails or is removed, the output of an analog signal generator 374 is substituted for the output of the analog signal conditioning circuit 372. This substitution is achieved by means of a switch 376 that is responsive to a WD-DRV signal generated by a switching circuit 322. The operation of the switching circuit 322 is the same as the operation of the switching circuit 22 shown in FIG. 1. When a watchdog circuit 310 detects a fault, it activates the switching circuit 322 through an enabling switch 338. In the configuration of FIG. 1, the enabling switch 38 merely activates the switching circuit 22. In the configuration of FIG. 3, the enabling switch 338 not only activates the switching circuit 322 but it also throws switch 376 so that the output of the analog signal generator 374 is substituted for the output of the analog signal conditioning circuit 372. In this manner an analog fault response is provided.

Figure 4:
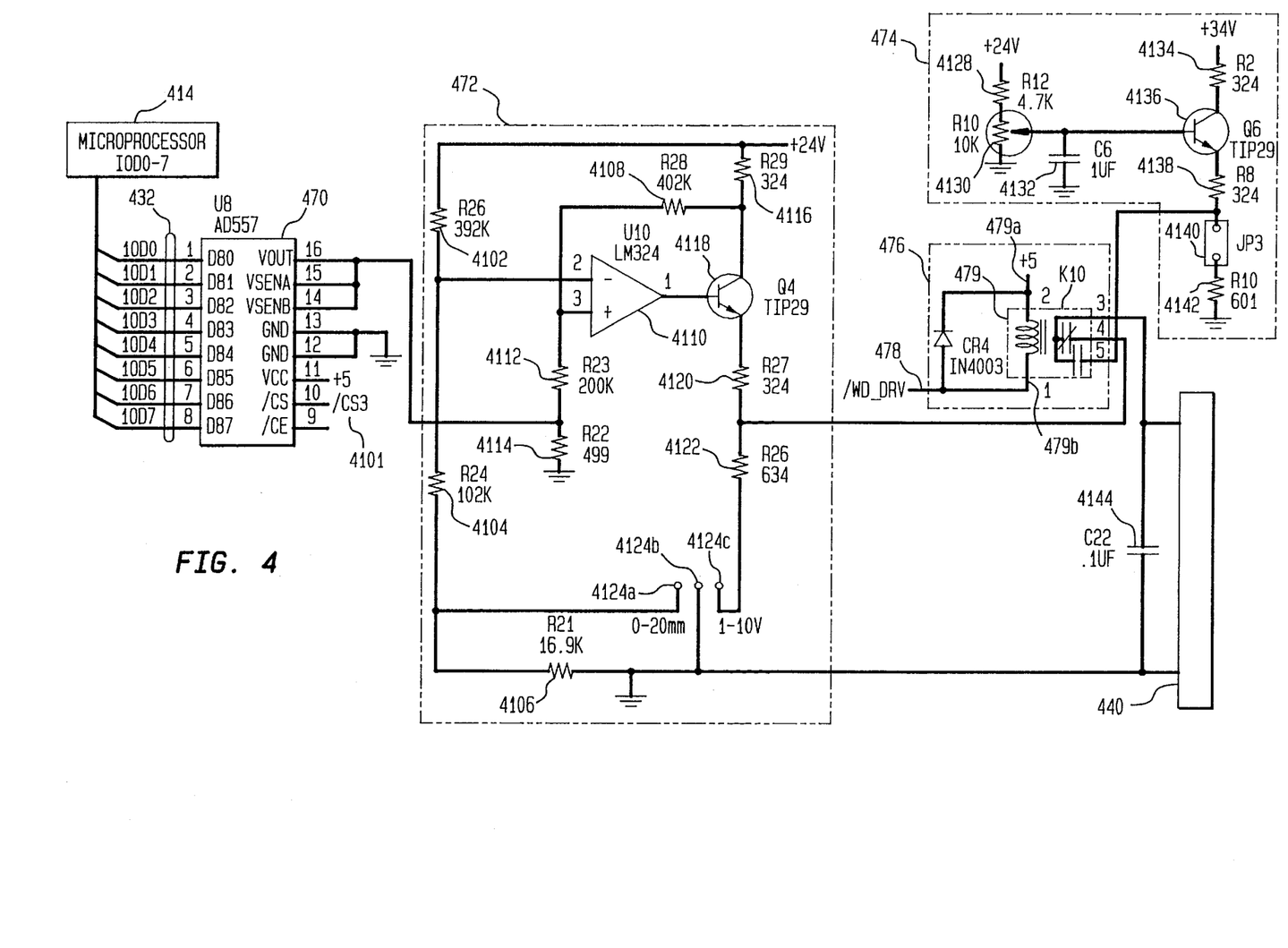
FIG. 4 is a schematic diagram of an illustrative embodiment of the invention including an analog output portion.
Figures 5, 5B:
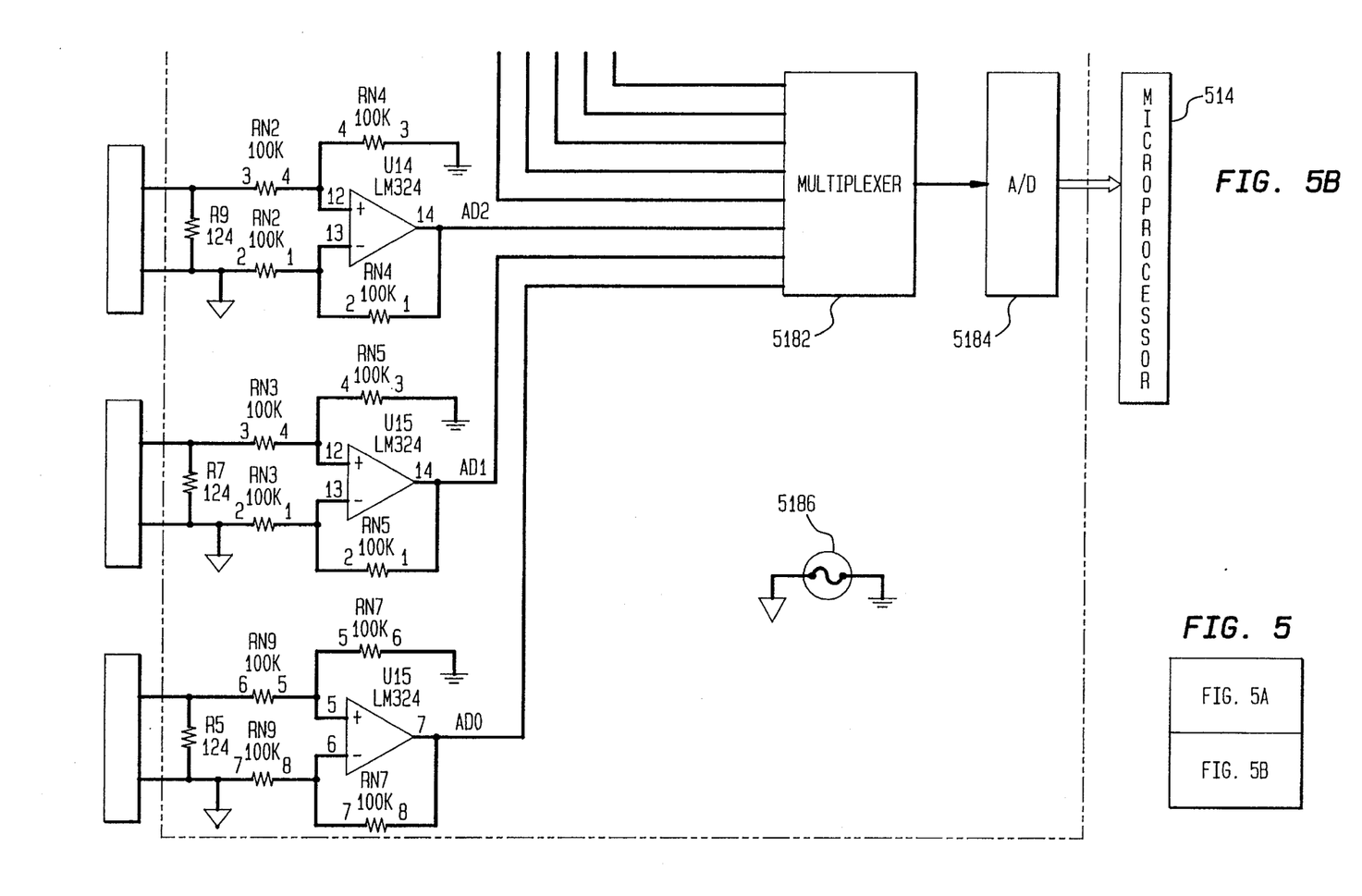
FIG. 5 is a schematic diagram of the analog input portion of an automatic process controller having analog input fault protection as set forth in the present invention.
Figure 5A:
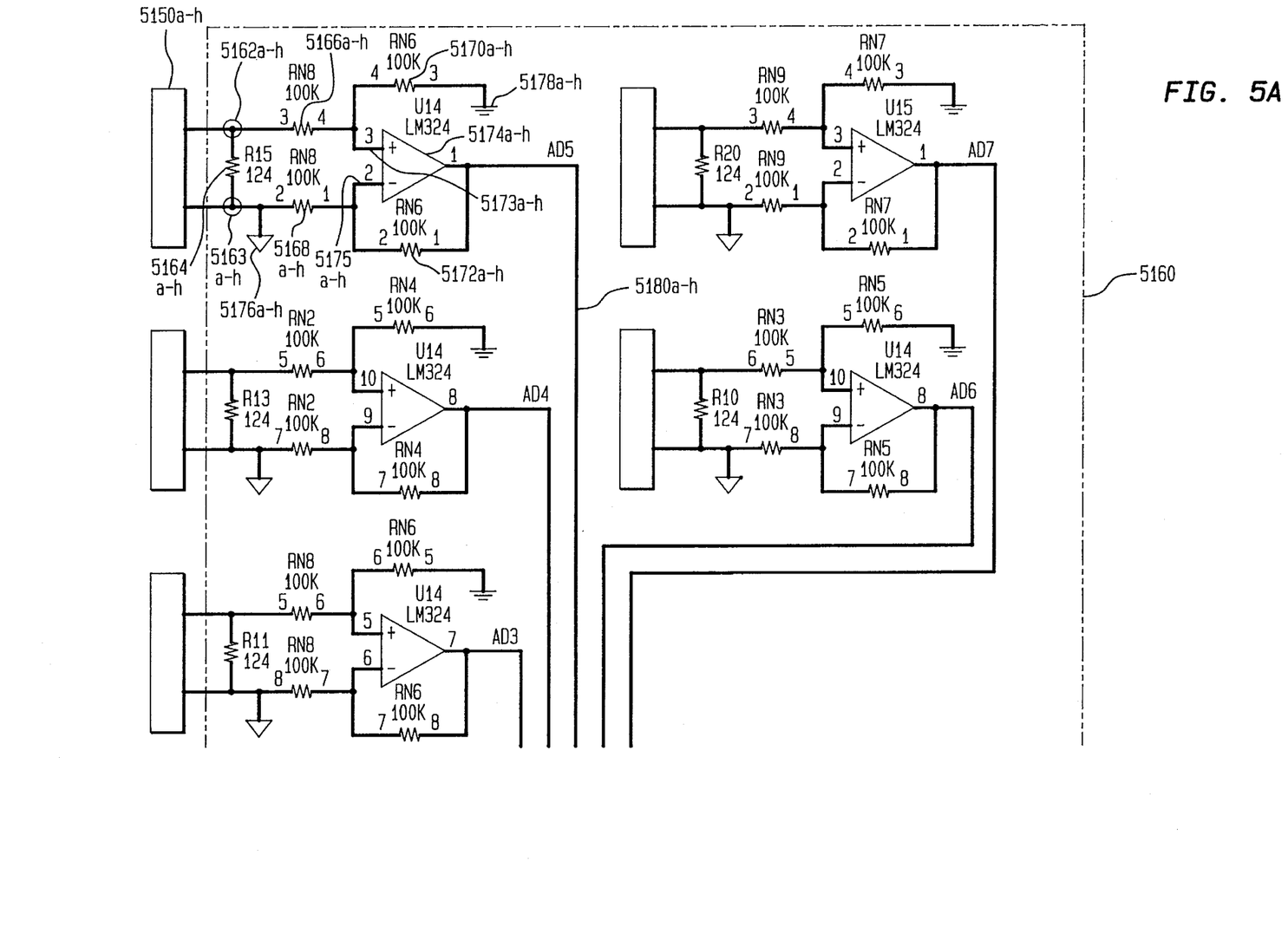

An illustrative embodiment of the above described invention is illustrated in FIGS. 2, 4, and 5. The illustrative embodiment shows the invention as it is applied in a fluid control system. The system has two pumps that control the flow of a fluid throughout a building, each pump requiring a high output power supply and a low output power supply. Four relays are required to switch the power supplies corresponding to each pump. Accordingly, FIG. 2 shows a relay bank 230 comprising eight relays 231a–h, four for each pump. The relays 230 are opened and closed in response to relay signals 232 generated by a microprocessor 214. The circuitry of the illustrative embodiment includes: a latch 234, line drivers 236a and 236b, a jumper circuit 224, and a switching circuit 222, all of which function similarly to their analogous circuit elements in FIG. 1. Like the circuitry associated with each relay 31a–n of FIG. 1, the circuitry associated with each relay 231a–h is the same, thus a detailed description of the circuitry associated with a single relay 231a will be provided with the understanding that circuitry associated with relays 231b–h operates in the same fashion.

Under normal operating conditions, the microprocessor 214 will control the position of relay 231a through a relay signal 233a. The signal 233a is passed through a latch 234a to a line driver 236a, the latch 234a being responsive to a clock signal 217. A resistor 48a of a resistor network 48a–h couples the input of the line driver 236a to ground. The line driver 236a provides amplification and buffering of the output of the latch 234a. The output of the line driver 236a is coupled to relay 231a by means of the jumper circuit 224. The relay 231a will be responsive to the output of the line driver 236a unless a fault is detected, in which case the relay will be responsive to the jumper circuit 224 and switching circuit 222a.

A jumper inserted into a contact 50a of contact network 50a–h, or a jumper inserted into contact 52a of contact network 52a–h, of the jumper circuit 224 will provide a path from the input of relay 231a to ground when a fault condition exists. The presence of a jumper between contacts 50a couples the relay 231a to a switch 54 of the switching circuit 222—diodes 60a and 62a of diode networks 60a–h and 62a–h, ensuring a uni-directional flow of current from the input of relay 231a to ground. The switch 54 is coupled to a MOSFET 58 that is activated by a watchdog signal 216 generated by a watchdog circuit 210. When there is a jumper inserted in contacts 50a, switch 54 is closed, and the watchdog signal 216 is high, the input of relay 231a will be coupled to ground. Alternatively, but in a similar manner, a jumper inserted in contacts 52a, a closed switch 56, and a high watchdog signal 216 will also couple the input of relay 231a to ground. When either of the conditions for the grounding of the input of relay 231a is met, the relay 231a will be set to its fault position. By selectively inserting jumpers into contacts 50a–h and 52a–h and by presetting switches 54 and 56 the fault positions of relays 231a–h, and thus the fault response of each pump, may be reconfigured at any time.

Referring further to FIG. 2, an illustrative embodiment of a watchdog circuit 210 is shown. The watchdog circuit 210 continuously monitors a clock signal 212 from the microprocessor 214 and generates a watchdog signal when an interruption of the clock signal 212 is detected. The clock signal 212 is used as input to both terminals of an OR gate 264, the output of the OR gate 264 being coupled to the anode of a diode 266 and a first terminal of a capacitor 268. The cathode of the diode 266 and a second terminal of the capacitor 268 are coupled to the base terminal of a PNP transistor 270. Also coupled to the transistor 270 are: a resistor 272, coupling the base to ground; a resistor, 274 coupling the emitter to a dc power source 275; a diode 278, with its anode connected to the emitter and its cathode connected to the dc power supply 275; a capacitor 276, coupling the emitter to ground; and a first input terminal 280a of an OR gate 280. The capacitor is charged through resistor 274 by the dc power source 275 when transistor 270 is in an "off" state. However, the pulses of the clock signal 212 periodically provide a high voltage level that turns transistor 270 "on", allowing capacitor 276 to discharge. In this manner the voltage at a first input terminal 280a of the OR gate 280 is maintained at a low level. As long as the voltage level at a second terminal 280b of OR gate 280 remains low, the watchdog signal 216 will remain low and the fault response of the system will not be triggered.

The fault response of the system may be triggered manually by means of a timeout switch 288 that is coupled to the second terminal 280b of the OR gate 280. When the switch 288 is open the second terminal 280b is coupled to ground through a resistor 290, when the switch is closed the terminal 280b is coupled to a high voltage level. A high voltage level at the terminal 280b drives the watchdog signal 216 high, regardless of the value at the first terminal 280a, thereby forcing activation of the system fault response. One advantage of the timeout switch 288 is in providing a means to test the fault response of the system after each reconfiguration.

The watchdog circuit 210 further provides an AC-OUT signal 218 and a visual alert, in the form of a red light 285, indicating that a fault has occurred. An OR gate 282 having the watchdog signal 216 as input to both its terminals, provides a high output when the watchdog signal 216 goes high. The output of the OR gate 282 is coupled to the anode of the red light 285 through a resistor 284. When the output of the OR gate 282 is driven high the light 285 turns on to alert the system operator that a fault has occurred.

The AC-OUT signal 218 is the output of an OR gate 286 having input terminals 286a and 286b. The input to terminal 286b is the watchdog signal 216. Terminal 286a is coupled to a first terminal 291 of a resistor 290 and to ground through a capacitor 292. A second terminal 293 of the resistor 290 is coupled to an OUTEN signal 287 and to a first terminal 295 of a resistor 288. A second terminal 297 of the resistor 298 is coupled to a power source 299 that supplies a high logic level voltage to the second terminal 297. The capacitor 292 is charged by the power source 299 when the OUTEN signal 287 is high, resulting in a high voltage at terminal 286a. When the OUTEN signal 287 is low, the capacitor will discharge an a low voltage will be present at terminal 286a. In this configuration either a high value of the watchdog signal 216 or a high value of the OUTEN signal 287 will drive the output of the OR gate 286 high and will result in a high value of the AC-OUT signal 218. The AC-OUT signal has two functions, when driven high it disables the latch 234 and triggers the alarm circuit 246.

The alarm circuit 246 functions to set an alarm relay 242 in the event of a fault. The alarm circuit comprises: a latch 294, a resistor 296, a MOSFET 2100, and a diode 298. Relay signal 233h is input to pin 5D of the latch 294. The signal is clocked through the latch by a clock signal 219 and is output at pin 5Q. In the event of a fault the latch 294 is disabled by the AC-OUT signal 218, thereby switching the gate voltage of the MOSFET 2100 and setting the fault position of the alarm relay 242. The gate of the MOSFET 2100 is coupled to ground by resistor 296 and the drain of the MOSFET 2100 is coupled to the anode of diode 298. The cathode of diode 298 is couple to one of the input terminals of the relay 242 while the anode is coupled to the second input terminal of the relay 242. The alarm relay 242 may be used to switch on an alarm that will alert a remote system operator that a fault has occurred.

The watchdog circuit 210 of the illustrative embodiment depicted in FIG. 2 not only triggers the fault response of the relays 230 and alarm relay 242, it also triggers an analog portion of the fault response. The analog portion of the fault response circuitry is shown in FIG. 4. It includes: a D/A converter 470, an analog signal conditioning circuit 472, an analog signal generator 474, and a switch 476. Each of these elements perform the same function as their analogous elements depicted in FIG. 3. When operating normally, a microprocessor 414 generates the desired analog signal level—in a digital form—over digital lines 432 to the D/A converter 470. The D/A converter 470, driven by a clock signal 4101, converts the digital information to an analog signal that is input to the analog conditioning circuit 472. The analog signal conditioning circuit 472 further conditions the signal prior to use by one or more process control elements 440 which require analog inputs. However, in the event of a fault, the switch 476 decouples the output of the analog conditioning circuit 472 from the process control elements 440 and couples the output of the analog signal generator 474 to the process control elements 440. A capacitor 4144, coupling the output of the switch 476 to ground helps protect the analog signal from AC corruption.

As can be seen from FIG. 4, the analog signal conditioning circuit 472 is comprised of: resistors 4102, 4104, 4106, 4108, 4112, 4114, 4116, 4120, and 4122; a comparator 4110; an NPN transistor 4118: and jumper contacts 4124a, 4124b, and 4124c. The aforementioned elements being coupled together as shown in FIG. 4. The jumper contacts 4124a–c are used to determine the form of the analog signal that will be input to the process control elements 440 during normal operation. When a jumper is inserted between contacts 4124a and 4124b a 0–20 mA signal will be input to the control elements 440, when a jumper is inserted between contacts 4124b and 4124c a 1–10 V signal will be input to the elements 440. In either case, the switch 476 will decouple the analog signal conditioning circuit 472 from the process control elements 440 when a fault occurs.

Referring further to FIG. 4, the switch 476 is comprised of a relay 479 and a diode 4126 with its cathode coupled to a first terminal 479a of the relay and its anode coupled to a second terminal 479b of the relay 479. Another input to the second terminal 479b of the relay 479 is a WD-DRV signal 478. The WD-DRV signal goes low when a fault occurs, thereby causing the relay 479 to switch to its fault position in which the output of the analog signal generator 474 is coupled to the process control elements 440.

The analog signal generator 474 is comprised of: resistors 4128, 4134, 4138, and 4142; a capacitor 4132; an NPN transistor 4136; a potentiometer 4130; and jumper contacts 4140—these elements being coupled together as shown in FIG. 4. The potentiometer 4130 is used to vary the value of the analog signal that is output from the analog signal generator 474 while the form of the signal—either a constant voltage or current—is set by the absence or presence of a jumper at jumper contacts 4140. Through the use of the potentiometer 4130 and the jumper contacts 4140 an easily reconfigurable analog fault response is realized.

In addition to providing a relay fault response and an analog fault response, the present invention provides for the protection of the automatic process controller from potentially destructive interference in the analog signals that are received from the process sensors.

Referring now to FIG. 5, there is shown an illustrative embodiment including eight process control sensors 5150a–h, an analog input circuit 5160, and a microprocessor 514. These three elements correlate, respectively, to process controller sensors 150, analog input circuit 160, and microprocessor 14 of FIG. 1. The process control sensors 5150a–h monitor various parameters associated with the process, and relay that information to the controller's microprocessor 514 where it is used to help determine the appropriate control settings. Since the circuitry associated with each one of the eight process control sensors 5150a–h is the same, a detailed description of the circuitry associated with one process control sensor 5150a will be sufficient to provide an understanding of the operation of the illustrative embodiment.

As shown in FIG. 5, process control sensor 5150a is coupled to a pair of jumper contacts 5162a and 5163a. The contacts 5162a and 5163a are coupled to each other through a protective resistor 5164a. Contact 5162a is coupled to a first terminal 5173a of a comparator 5174a through a resistor 5166a, and contact 5163a is coupled to a second terminal 5175a of the comparator 5174a through a resistor 5168a. The contact 5163a is also coupled to ground through a fuse 5186. The first terminal 5173a of the comparator 5174a, a resistor 5170, and the fuse 5186 are coupled together in series to form a path from the terminal 5173 to ground. The second terminal of the comparator 5175a is also coupled to the output of the comparator 5180a.

Under normal operating conditions the comparator 5174a amplifies and buffers the output of the process sensor 5150a to generate an output signal 5180a that is input to a multiplexer 5182. The multiplexer 5182 functions to sequentially couple the output of each comparator 5174a–h to an analog to digital converter 5184, which, in turn, converts the output of the multiplexer 5182 to a digital form that can be "read" by the microprocessor 514. In this manner, the data from the process sensors 5150a–h can be monitored by the automatic process controller's microprocessor 514.

The principal advantage of the configuration of FIG. 5 is realized by the provision of the protective resistors 5164a–h and the contacts 5162a–h and 5163a–h. The protective resistors 5164a–h function as conversion resistors while protecting the components of the analog input circuit 5160 from potentially destructive faults. The resistors 5164a–h, which may be of the metal film type, act as fuses which are sacrificed in the event of such a fault. For example, if the output of the process sensor 5150a were to be accidently coupled to a higher than normal potential, the protective resistor 5164a would be sacrificed, thereby protecting the other components of the analog input circuit 5160 from damage.

Replacement of such a blown resistor is facilitated by the contacts 5162a and 5163a which allow a technician to simply unplug the burnt resistor and plug in a new one. Further protection against high level interference is provided by the fuse 5186 which is in common with all the contacts 5163a–h.

Herein, a circuit for providing microprocessor fault control has been described. Although the present embodiment of the invention has been described in detail it should be understood that various changes, alterations, and substitutions can be made therein without departing from the spirit of the invention.

I claim:

1. A fault control circuit for use with an automatic process controller generating at least one relay signal, comprising:

a fault detection circuit for sensing an interruption of a clock signal and providing a fault indication signal and a relay disabling signal upon interruption of said clock signal;

at least one first electrically-triggered switching means operative to control the automatic process in response to said at least one relay signal, said first switching means being switched to a predetermined fault position in response to said fault indication signal and said relay disabling signal;

a switching circuit; and selection means which, together with said switching circuit, selectively determine said predetermined fault position of said first switching means, wherein said relay disabling signal disables said at least one relay signal and, said fault indication signal enabling the settings of both said switching circuit and said selection means to establish said predetermined fault position of said first switching means.

2. The fault control circuit according to claim 1, further comprising:

at least one second electrically-triggered switching means for triggering an alarm in response to said fault indication signal.

3. The fault control circuit according to claim 1, further comprising:

a visual indicator for alerting a human operator that a fault has occurred, said visual indicator being activated by said fault indication signal.

4. The fault control circuit according to claim 1, further comprising:

a test means for testing the fault response of the automatic process controller.

5. The fault control circuit according to claim 1, further comprising:

a latch for coupling control signals to said first switching means, said latch being disabled by said fault indication signal in the event of a fault.

6. The fault control circuit according to claim 1, further comprising:

at least one protective resistance means, integral to an analog input portion of the automatic process controller, for protecting said analog input portion from faults in the signals received by said analog input portion, said protective resistance means having the property that it is easily replaceable.

7. A microprocessor-based fault control circuit for use in a flow control system, comprising:

a fault detection circuit for sensing an interruption of a microprocessor clock signal, said fault detection circuit provides a fault indication signal upon interruption of said microprocessor clock signal;

at least one first relay operative to control at least a portion of said flow control system, said at least one relay being set to a predetermined fault position in response to said fault indication signal;

a switching circuit; and selection means which, together with said switching circuit, selectively determine said predetermined fault position of said first relay, settings of said switching circuit and said selection means being used to preset said predetermined fault position of said first relay.

8. The microprocessor-based fault control circuit according to claim 7, further comprising:

at least one second relay for triggering an alarm in response to said fault indication signal.

9. The microprocessor-based fault control circuit according to claim 7, further comprising:

a visual indicator for alerting a human operator that a fault has occurred, said visual indicator being activated by said fault indication signal.

10. The microprocessor-based fault control circuit according to claim 7, further comprising:

a test means for testing the fault response of the automatic process controller.

11. The microprocessor-based fault control circuit according to claim 7, further comprising:

a latch for coupling control signals to said first relay, said latch being disabled by said fault indication signal in the event of a fault.

12. In a fluid flow controller of the type employing a microprocessor to control electrically powered pumps that drive the flow of fluid throughout a predefined environment, each pump being operable from a high level power supply and a low level power supply, and at least one of said pumps having an output speed variable in proportion to an input signal, a microprocessor-based fault control circuit, comprising:

a fault detection circuit for sensing an interruption of a microprocessor clock signal, whereby, said fault detection circuit provides a fault indication signal upon interruption of said microprocessor clock signal;

a plurality of relays operative to control said pumps, at least one first relay being disposed for coupling a high level power supply to at least one pump, and at least one second relay being disposed for coupling a low level power supply to at least one pump, whereby said plurality of relays are each set to a predetermined fault position in response to said fault indication signal;

a switching circuit;

a selection means which, together with said switching circuit, selectively determine said predetermined fault positions of said plurality of relays, the settings of said switching circuit and said selection means being used to preset said predetermined fault positions of said plurality of relays;

a fault-activated output circuit operative to provide a signal used to set the speed of said pumps having an output speed responsive to an input signal; and a means responsive to said fault indication signal for activating said fault-activated output circuit.

13. The microprocessor-based fault control circuit according to claim 12, wherein said fault-activated output circuit further comprises a means for varying the level of said signal provided by said fault-activated output circuit.

14. The microprocessor-based fault control circuit according to claim 12, wherein said fault activated output circuit further comprises a means for selecting between current and voltage as the form of said signal used to set the speed of said pumps.

15. The microprocessor-based fault control circuit according to claim 13, wherein said means for varying the level of said signal is a potentiometer.

16. The microprocessor-based fault control circuit according to claim 12, wherein said means for activating said fault-activated output circuit comprises at least one first relay.

17. The microprocessor-based fault control circuit according to claim 12, further comprising:

at least one second relay for triggering an alarm in response to said fault indication signal.

18. The microprocessor-based fault control circuit according to claim 12, further comprising:

a visual indicator for alerting a human operator that a fault has occurred, said visual indicator being activated by said fault indication signal.

19. The microprocessor-based fault control circuit according to claim 12, further comprising:

a test means for testing the fault response of the automatic process controller.

20. The microprocessor-based fault control circuit according to claim 12, further comprising:

a latch for coupling control signals to said first relay, said latch being disabled by said fault indication signal in the event of a fault.

* * * * *